(12) United States Patent
Ko

(10) Patent No.: US 12,087,466 B2
(45) Date of Patent: Sep. 10, 2024

(54) TRANSMISSION LINE AND MANUFACTURE METHOD OF ISOLATING LAYER THEREOF

(71) Applicant: Tsun Yi Ko, Taipei (TW)

(72) Inventor: Tsun Yi Ko, Taipei (TW)

(\*) Notice: Subject to any disclaimer, the term of this patent is extended or adjusted under 35 U.S.C. 154(b) by 402 days.

(21) Appl. No.: 17/473,231

(22) Filed: Sep. 13, 2021

(65) Prior Publication Data

US 2022/0415540 A1    Dec. 29, 2022

(30) Foreign Application Priority Data

Jun. 25, 2021 (TW) .................................. 110123429

(51) Int. Cl.
| | |
|---|---|
| *H01B 11/18* | (2006.01) |
| *C08L 23/06* | (2006.01) |
| *C08L 23/28* | (2006.01) |
| *C08L 27/18* | (2006.01) |
| *C08L 71/02* | (2006.01) |

(52) U.S. Cl.
CPC .......... *H01B 11/1895* (2013.01); *C08L 23/06* (2013.01); *C08L 23/28* (2013.01); *C08L 27/18* (2013.01); *C08L 71/02* (2013.01); *C08L 2203/202* (2013.01)

(58) Field of Classification Search
CPC ........... H01B 11/1895; C08L 2203/202; C08L 23/06; C08L 23/28; C08L 27/18; C08L 71/02
See application file for complete search history.

(56) References Cited

U.S. PATENT DOCUMENTS

| | | | | |
|---|---|---|---|---|
| 3,163,836 | A * | 12/1964 | Sugi .................... | H01B 7/30 178/45 |
| 9,363,935 | B1 * | 6/2016 | Cook ................... | H05K 9/0098 |
| 10,472,742 | B1 * | 11/2019 | May ....................... | D02G 3/441 |
| 2012/0163758 | A1 * | 6/2012 | Mccullough ........... | H01B 3/427 385/101 |
| 2012/0298403 | A1 * | 11/2012 | Johnson ................. | H01B 5/105 174/130 |
| 2017/0287591 | A1 * | 10/2017 | Zhang ................... | H01B 13/08 |
| 2019/0164667 | A1 * | 5/2019 | Huang ................ | B60R 16/0215 |
| 2020/0343014 | A1 * | 10/2020 | Kaneko .................. | C22F 1/043 |

\* cited by examiner

*Primary Examiner* — William H. Mayo, III
*Assistant Examiner* — Rhadames Alonzo Miller
(74) *Attorney, Agent, or Firm* — Christensen, Fonder, Dardi & Herbert PLLC

(57) ABSTRACT

A transmission line includes a conductor for signal transmission and an isolating layer covering the conductor. The isolating layer includes a first isolating strand group and a second isolating strand group. The first isolating strand group is wound in a way that forms an S-twist around the conductor along an axis direction the conductor, and the second isolating strand group is wound in a way that forms a Z-twist around the conductor along the axis direction. In an interval from a first position to a second position, including the first position, the first isolating strand group continuously overlaps an outside of the second isolating strand group, and in an interval from the second position to a third position, including the second position, the second isolating strand group continuously overlaps an outside of the first isolating strand group.

14 Claims, 8 Drawing Sheets

TRANSMISSION LINE AND MANUFACTURE METHOD OF ISOLATING LAYER THEREOF

CROSS-REFERENCES TO RELATED APPLICATIONS

The present invention claims priority under 35 U.S.C. § 119 to Taiwan Patent Application No. 110123429 filed on Jun. 25, 2021, the entire content of which is incorporated herein by reference.

BACKGROUND OF THE INVENTION

Field of the Invention

Embodiments of the disclosed invention relate to a transmission line and a method for manufacturing an isolating layer of the transmission line. More specifically, embodiments of the disclosed invention relate to a transmission line with a special structure and a method for manufacturing an isolating layer of the transmission line.

Descriptions of the Related Art

Most traditional transmission lines are produced with a single isolating individual which is formed by integration on the surface of a conductor in a laminated way as an isolating layer of the transmission line, as an example. Under this situation, it is common to improve the isolation ability by increasing the thickness of the isolating layer. However, this way is not suitable for a small-scale transmission line because increasing the thickness of an isolating layer of the small-scale transmission line will also make the outer diameter of the small-scale transmission line increase. In addition, in the case where the outer diameter of a transmission line is limited, the thickness of the conductor of the transmission line must decrease as the thickness of the isolating layer of the transmission line increases, and thus the transmission rate of the transmission line will decrease. Given this, it is important in the art to devise a better way of improving the isolation ability of a transmission line.

SUMMARY OF THE INVENTION

To solve at least the aforementioned problems, embodiments of the disclosed invention provide a transmission line. The transmission line comprises a conductor for signal transmission and an isolating layer covering the conductor. The isolating layer comprises a first isolating strand group and a second isolating strand group. The first isolating strand group is wound in a way that forms an S-twist around the conductor along an axis direction of an axis of the conductor, and the second isolating strand group is wound in a way that forms a Z-twist around the conductor along the axis direction. The first isolating strand group continuously overlaps an outside of the second isolating strand group in an interval from a first position to a second position, and the second isolating strand group continuously overlaps an outside of the first isolating strand group in an interval from the second position to a third position, wherein the first position, the second position and the third position are defined in order along the axis direction. The first isolating strand group overlaps the outside of the second isolating strand group at the first position and the third position, and the second isolating strand group overlaps the outside of the first isolating strand group at the second position. The first position, the second position and the third position respectively correspond to a first projection position, a second projection position and a third projection position on a plane to which the axis as a normal vector is orthogonal. The first projection position and the second projection position define an included angle relative to the axis and the second projection position and the third projection position define the included angle.

To solve at least the aforementioned problems, embodiments of the disclosed invention also provide a method for manufacturing an isolating layer of a transmission line. The method comprises: winding a first isolating strand group in a way that forms an S-twist around a conductor along an axis direction of an axis of the conductor; and winding a second isolating strand group in a way that forms a Z-twist around the conductor along the axis direction; wherein the first isolating strand group and the second isolating strand group form the isolating layer of the transmission line; wherein the first isolating strand group continuously overlaps an outside of the second isolating strand group in an interval from a first position to a second position, and the second isolating strand group continuously overlaps an outside of the first isolating strand group in an interval from the second position to a third position, wherein the first position, the second position and the third position are defined in order along the axis direction; wherein the first isolating strand group overlaps the outside of the second isolating strand group at the first position and the third position, and the second isolating strand group overlaps the outside of the first isolating strand group at the second position; and wherein the first position, the second position and the third position respectively correspond to a first projection position, a second projection position and a third projection position on a plane to which the axis as a normal vector is orthogonal, and the first projection position and the second projection position define an included angle relative to the axis and the second projection position and the third projection position define the included angle.

The disclosed isolating layer is not formed by a single isolating individual, but instead, formed by a plurality of isolated strands among which there is at least one air gap. The special structure of the isolating layer can provide better dielectric strength because the dielectric constant of air is one. Therefore, the disclosed isolating layer can provide better isolation ability than a traditional isolating layer as the thickness of the disclosed isolating layer is the same as the traditional isolating layer. Alternatively, the disclosed isolating layer can be formed with a smaller thickness than a traditional isolating layer as the isolation ability of the disclosed isolating layer is almost the same as the traditional isolating layer. Thus, the outer diameter of the disclosed transmission line can decrease, which means that the dimension of the disclosed transmission line can decrease, or the thickness of the disclosed conductor can increase, which means that the transmission rate can increase. It should be appreciated that the disclosed transmission line has an edge over high-speed transmission because high-speed transmission is more sensitive to isolation ability.

On the other hand, the isolating layer which is formed by integration on the surface of a conductor of a traditional transmission line ideally isolates the conductor from the air; in other words, there is no intentional air gap in the isolating layer of the traditional transmission line. In contrast, at least one air gap of the disclosed isolating layer can introduce air being a good dielectric medium into the disclosed transmission line, and thus the disclosed transmission line achieves a higher transmission rate.

Moreover, as compared with a double spiral isolating layer without any overlap which is formed by winding the first isolating strand group around the conductor and then winding the second isolating strand group around the outside of the first isolating strand group, the disclosed isolating layer with two overlaps (i.e., the overlapping relationship between the first isolating strand group and the second isolating strand group is changed at the second position and the third position) provides a more stable structure which is less loose. As compared with an isolating layer with many overlaps, the disclosed isolating layer with two overlaps provides a better transmission rate because the outer part of the disclosed isolating layer is more even. Thus, the disclosed isolating layer with two overlaps can keep both of the advantages.

This summary is not intended to limit the scope of the claimed invention, but merely outlines the solvable technical problems, the usable technical means, and the achievable technical effects. As combined with the attached drawings and the following description, a person having ordinary skill in the art can further understand the details of a variety of embodiments of the disclosed invention.

DESCRIPTION OF EMBODIMENTS

Figure 1:
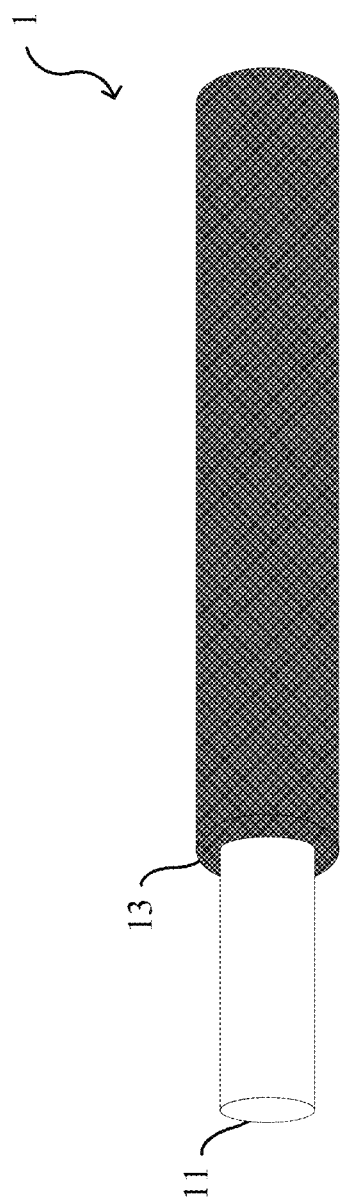
FIG. 1 illustrates a schematic profile of a transmission line according to some embodiments of the disclosed invention.

The disclosed invention will be described with reference to embodiments thereof hereinafter. However, these embodiments do not intend to limit the disclosed invention to any operations, environment, applications, structures, processes, or steps described in these embodiments. For ease of description, contents unrelated to the embodiments of the disclosed invention or contents that shall be appreciated without particular description are omitted. Dimensions of elements and proportional relationships among individual elements in the attached drawings are only exemplary examples and do not intend to limit the scope of the claimed invention. Unless specifically stated, same (or similar) reference numerals may correspond to the same (or similar) elements in this disclosure. Unless otherwise specified, the number of each element described below shall be one or more while it is implemented.

Unless the context distinctly indicates otherwise, singular forms "a" and "an" are intended to comprise the plural forms as well. The terms such as "comprising" and "including" specify the presence of stated features or components, but do not preclude the presence or addition of one or more other features or components. Unless the context distinctly indicates otherwise, the term "and/or" includes any and all combinations of one or more of the associated listed items.

FIG. 1 illustrates a schematic profile of a transmission line according to some embodiments of the disclosed invention. The contents of FIG. 1 are shown as an example illustrating related embodiments and do not intend to limit the scope of the claimed invention. Referring to FIG. 1, a transmission line 1 may comprise a conductor 11 for signal transmission and an isolating layer 13. The conductor 11 can be a single wire, or a combination of multiple wires (e.g., stranded conductors). The conductor 11 can be made of one or more metals such as silver, copper, aluminum. The isolating layer 13 may cover the conductor 11 to isolate the conductor 11 from outside.

Figure 2A:
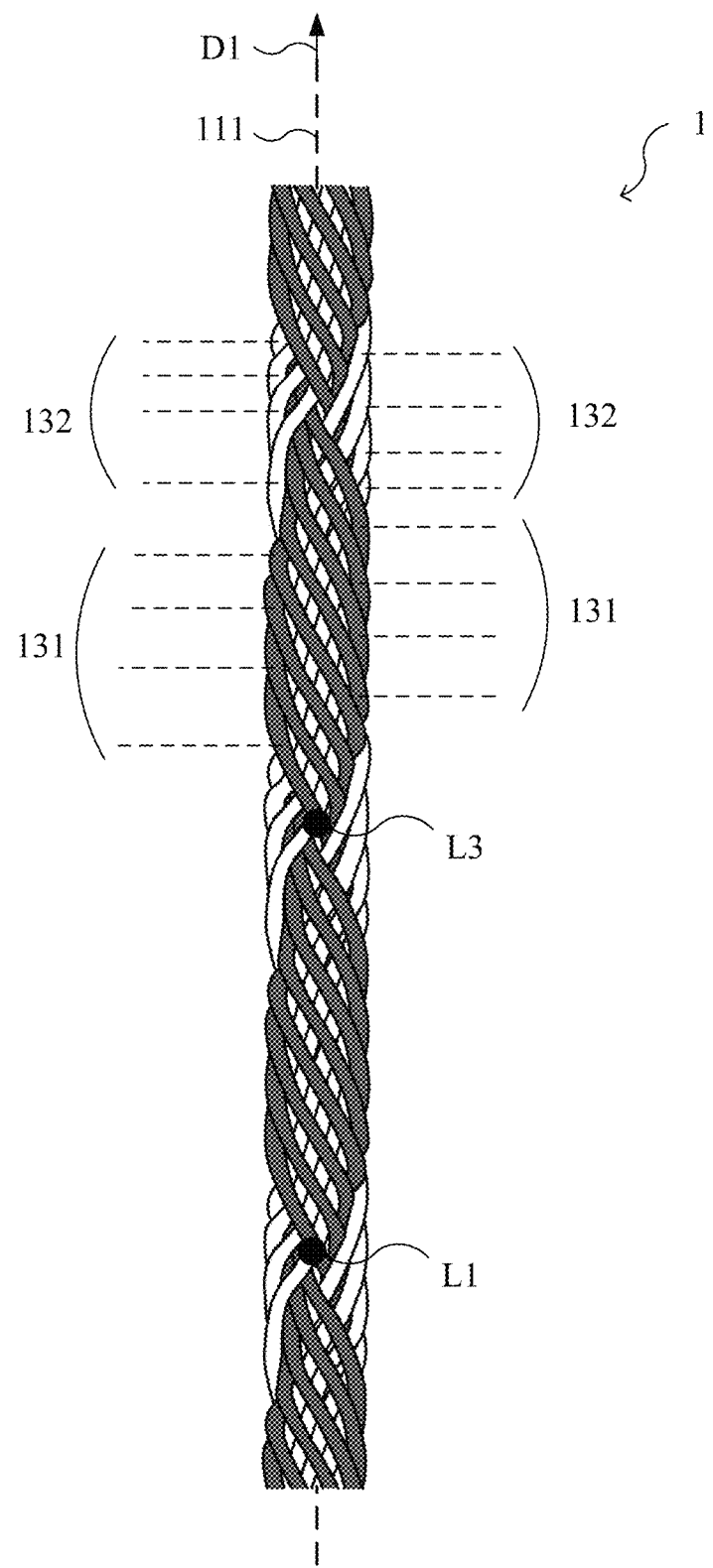
FIG. 2A illustrates a schematic structure of an isolating layer of a transmission line according to some embodiments of the disclosed invention.

FIG. 2A illustrates a schematic structure of an isolating layer of a transmission line according to some embodiments of the disclosed invention. The contents of FIG. 2A is shown as an example illustrating related embodiments and do not intend to limit the scope of the claimed invention. Referring to FIG. 2A, an isolating layer 13 may comprise a first isolating strand group 131 and a second isolating strand group 132. The first isolating strand group 131 may comprise a plurality of first isolated strands, and the second isolating strand group 132 may comprise a plurality of second isolated strands. In some embodiments, each of the first isolated strands can be made of a first isolating polymeric material, and each of the second isolated strands can be made of a second isolating polymeric material. Each of the first isolating polymeric materials and the second isolating polymeric material can be chosen from one of Fluorinated Ethylene Propylene (FEP), Perfluoroalkoxy Alkanes (PFA), Polyethylene (PE) and Polytetrafluoroethene (PTFE) or any combination thereof. The shape of a cross-section of the disclosed first/second isolated strand can be substantially a circle.

In some embodiments, the first isolating polymeric material and the second isolating polymeric material can be the same. In some other embodiments, the first isolating polymeric material and the second isolating polymeric material can be different, which means the isolating layer 13 can be made of more than one isolating polymeric material.

In some embodiments, the isolating layer 13 may comprise a first elongated isolation group 131 and a second elongated isolation group 132. The first elongated isolation group 131 may comprise a plurality of first elongated isolations, and the second elongated isolation group 132 may comprise a plurality of second elongated isolations. The shape of a cross-section of the disclosed first/second elongated isolation can be a slice-like shape, a lump-like shape, an ellipse, a square, a rectangle, a hexagon, an octagon, etc.

Referring to FIG. 1 and FIG. 2A, the first isolating strand group 131 can be wound in a way that forms an S-twist around the conductor 11 along an axis direction D1 of an axis 111 of the conductor 11, and the second isolating strand group 132 can be wound in a way that forms a Z-twist around the conductor 11 along the axis direction D1. More specifically, the way of forming the S-twist can be performed by winding the first isolating strand group 131 counterclockwise as facing the opposite direction of the axis direction D1, and the way of forming the Z-twist can be performed by winding the second isolating strand group 132 clockwise as facing the opposite direction of the axis direction D1. It is known in the art how to form the so-called "S-twist" and "Z-twist", and it is clear enough that the first isolating strand group 131 and the second isolating strand group 132 are wound as the so-called "S-twist" and "Z-twist" respectively. Thus, the details of the so-called "S-twist" and "Z-twist will not be mentioned in detail.

Figure 2B:
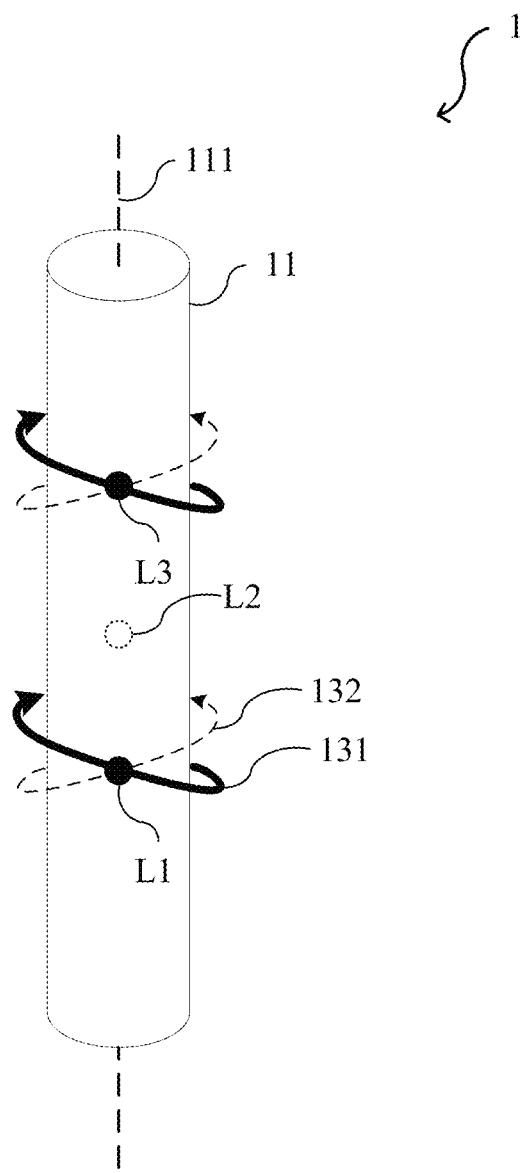
FIG. 2B illustrates a schematic simplified structure of the isolating layer shown by FIG. 2A according to some embodiments of the disclosed invention.
Figure 2C:
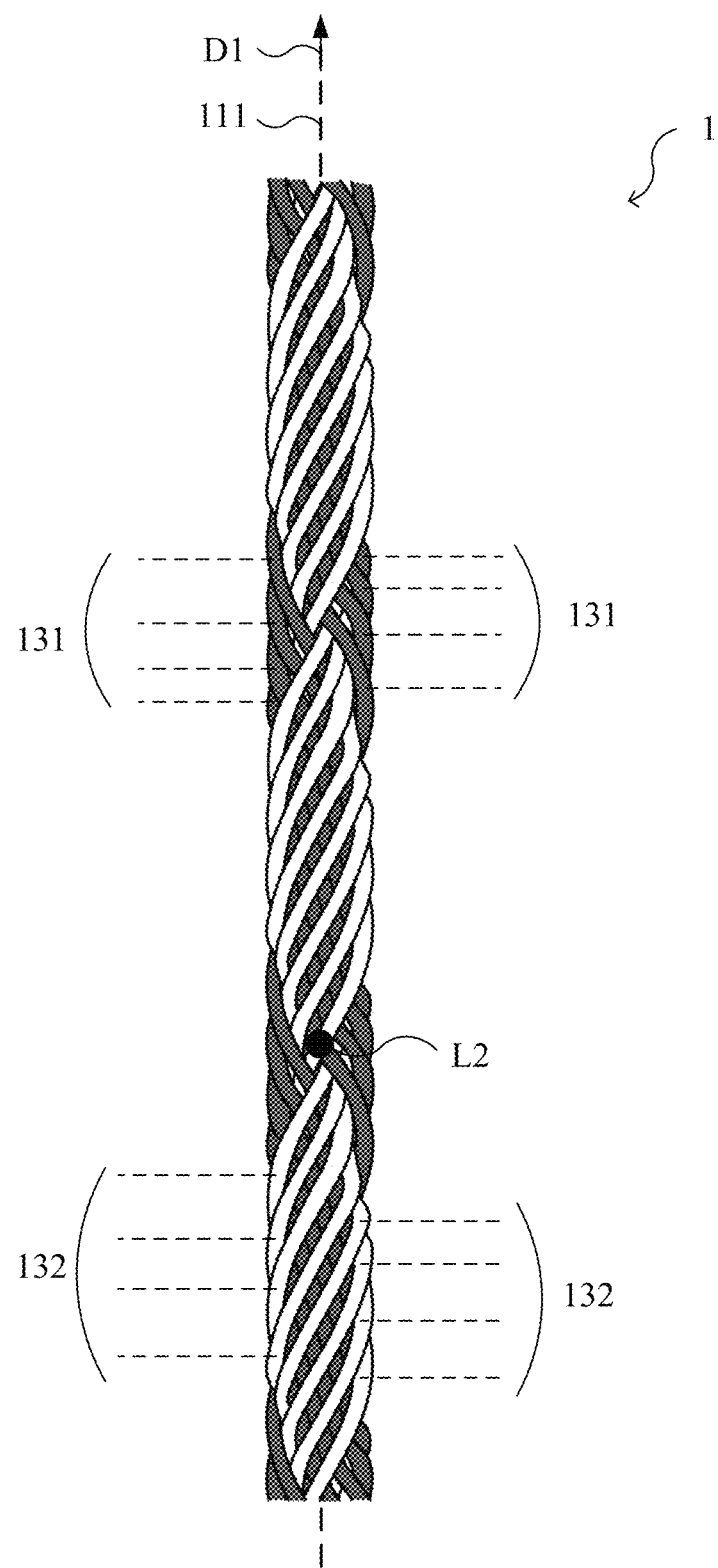
FIG. 2C illustrates a schematic structure of the isolating layer shown by FIG. 2A as seen from the opposite according to some embodiments of the disclosed invention.
Figure 2D:
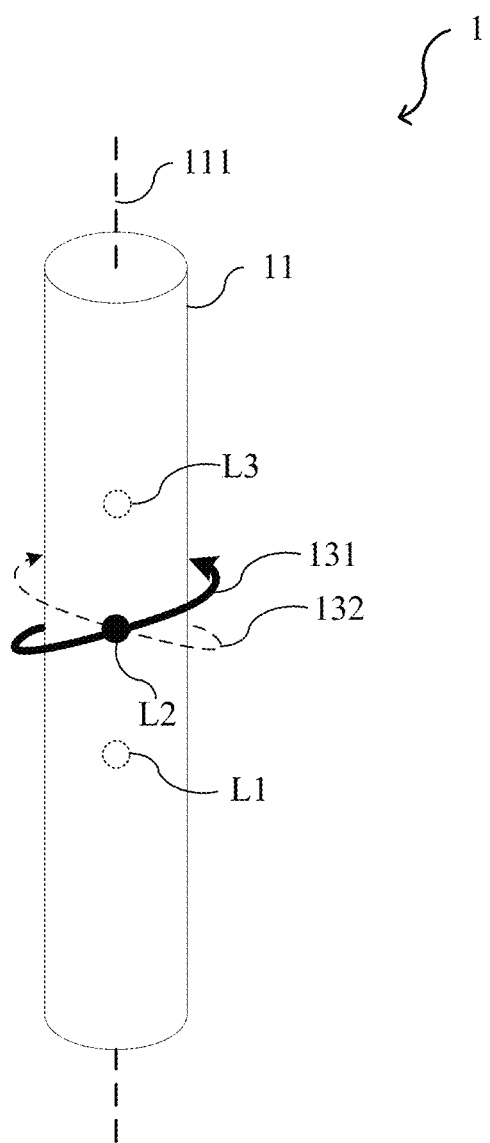
FIG. 2D illustrates a schematic simplified structure of the isolating layer shown by FIG. 2C according to some embodiments of the disclosed invention.
Figure 2E:
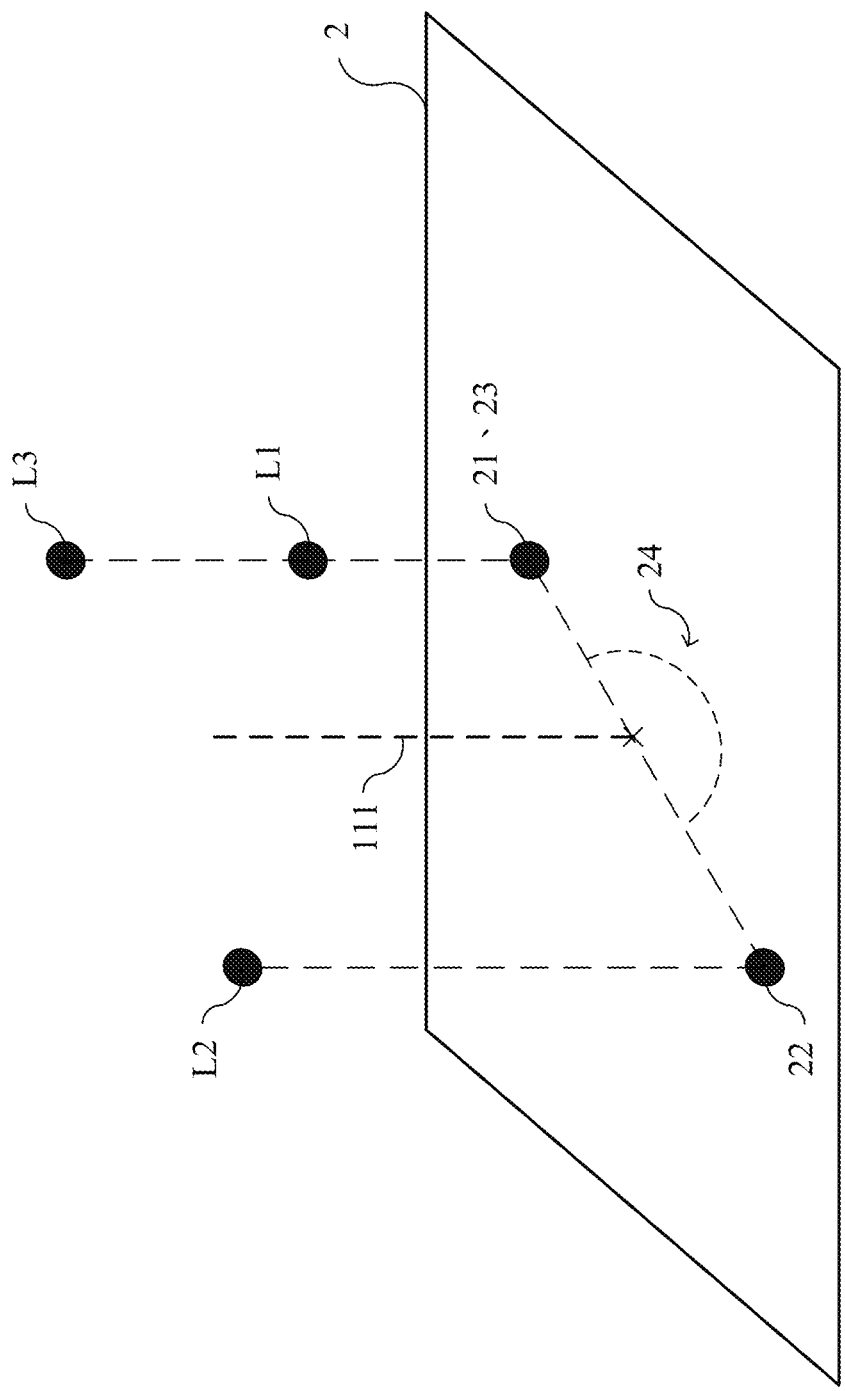
FIG. 2E illustrates a plane orthogonal to an axis of a conductor into which the first position, the second position and the third position shown by FIGS. 2A-2D are projected, according to some embodiments of the disclosed invention.

FIG. 2B illustrates a schematic simplified structure of the isolating layer shown by FIG. 2A according to some embodiments of the disclosed invention. FIG. 2C illustrates a schematic structure of the isolating layer shown by FIG. 2A as seen from the opposite according to some embodiments of the disclosed invention. FIG. 2D illustrates a schematic simplified structure of the isolating layer shown by FIG. 2C according to some embodiments of the disclosed invention. FIG. 2E illustrates a plane orthogonal to an axis of a conductor into which the first position, the second position and the third position shown by FIGS. 2A-FIG. 2D are projected, according to some embodiments of the disclosed invention. The contents of any of FIGS. 2B-FIG. 2E are shown as an example illustrating related embodiments and do not intend to limit the scope of the claimed invention.

For ease of description, as shown in FIG. 2B and FIG. 2D, the first isolating strand group 131 is simplified into a solid bold line with an arrowhead, while the second isolating strand group 132 is simplified into a dashed line with an arrowhead; however, the simplification is not intended to limit the scope of the claimed invention.

Referring to FIGS. 2A-FIG. 2D, in an interval from a first position L1 of the conductor 11 to a second position L2 of the conductor 11, including the first position L1, the first isolating strand group 131 continuously overlaps an outside of the second isolating strand group 132. In addition, in an interval from the second position L2 to a third position L3 of the conductor 11, including the second position L2, the second isolating strand group 132 continuously overlaps an outside of the first isolating strand group 131. Similarly, in an interval from the third position L3 to a fourth position (not shown) of the conductor 11, including the third position L3, the first isolating strand group 131 continuously overlaps the outside of the second isolating strand group 132 again. The winding process will be continued until the isolating layer 13 with a necessary length is formed for the transmission line 1. Along the axis direction D1, the first position L1, the second position L2, third position L3 and the fourth position (not shown) are shown in order. In other words, the first position L1, the second position L2, third position L3 and the fourth position (not shown) are defined in order along the axis direction D1. It should be appreciated that the dotted circle representing the second position L2 as shown by FIG. 2B means that the second position L2 is on the back of the viewed conductor 11. Likewise, the dotted circles representing the first position L1 and the third position L3 as shown by FIG. 2D means that the first position L1 and the third position L3 are on the back of the viewed conductor 11.

More specifically, all of the first isolated strands of the first isolating strand group 131 are inside the second isolating strand group 132 relative to the axis 111 of the conductor 11 before the first position L1, but instead, the first isolated strands of the first isolating strand group 131 gradually move to the outside of the second isolating strand group 132 from the first position L1. Likewise, the first isolated strands of the first isolating strand group 131 gradually move to the inside of the second isolating strand group 132 from the second position L2.

Referring to FIGS. 2A-2E, the first position L1, the second position L2 and the third position L3 can be respectively projected into a first projection position 21, a second projection position 22 and a third projection position 23 on a plane 2 to which the axis 111 of the conductor 11 as a normal vector is orthogonal. The first projection position 21 and the second projection position 22 may define an included angle 24 relative to the axis 111 of the conductor 11. Likewise, the second projection position 22 and the third projection position may define the included angle 24.

In some embodiments, the included angle 24 can be an angle of 180 degrees. In this case, the second projection position 22 and the first projection position 21 are at opposite sides of the axis 111 of the conductor 11, and the second projection position 22 and the third projection position 23 are also at opposite sides of the axis 111 of the conductor 11. For example, if the first projection position 21 is defined by a zero-degree angle on the plane 2 relative to the axis 111 of the conductor 11, the second projection position 22 can be defined by a near 180-degree angle on the plane 2 relative to the axis 111 of the conductor 11, and the third projection position 23 can be defined by a near 360-degree angle on the plane 2 relative to the axis 111 of the conductor 11. Accordingly, the first isolating strand group 131 and the second isolating strand group 132 have together covered the conductor 11 around from the first position L1 to the third position L3, thereby forming an isolation unit of the isolating layer 13.

In some embodiments, a dielectric constant of the isolating layer 13 with the special structure is between 1.6 and 2.3. Preferably, the dielectric constant of the isolating layer 13 is 1.67, 2.0, 2.03, 2.05, 2.1, or 2.26 with a standard/tolerable deviation.

Figure 3:
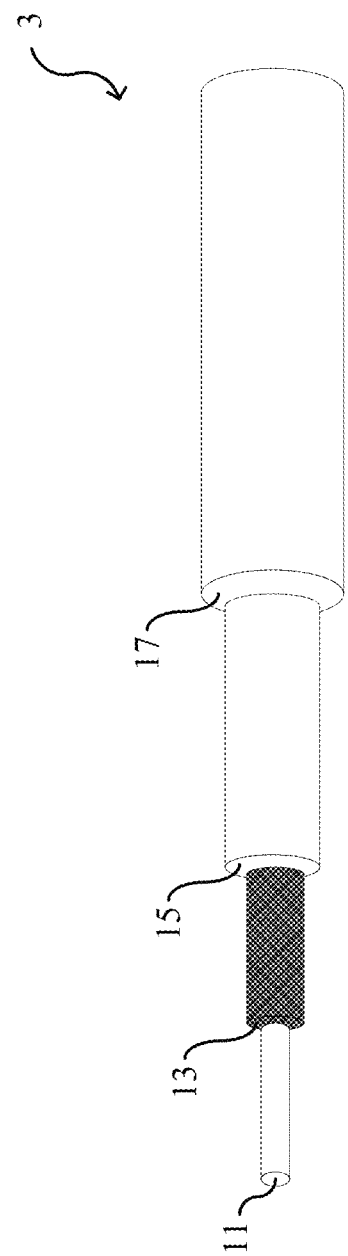
FIG. 3 illustrates a schematic profile of another transmission line according to some embodiments of the disclosed invention.

FIG. 3 illustrates a schematic profile of another transmission line according to some embodiments of the disclosed invention. The contents of FIG. 3 are shown as an example illustrating related embodiments and does not intend to limit the scope of the claimed invention.

Referring to FIG. 3, the transmission line 3 is a coaxial cable, and thus the transmission line 3 further comprises a shielding layer 15 and a protecting layer 17 in addition to the conductor 11 and the isolating layer 13. The shielding layer 15 can be arranged to cover the isolating layer 13, and the protecting layer 17 can be arranged to cover the shielding layer 15. The shielding layer 15 can be a metallic mesh made of copper or alloy for avoiding outside microwave interference to the conductor 11 and reducing loss of signal transmission. The protecting layer 17 is made of isolating materials and aims to protect the transmission line 3.

Figure 4:
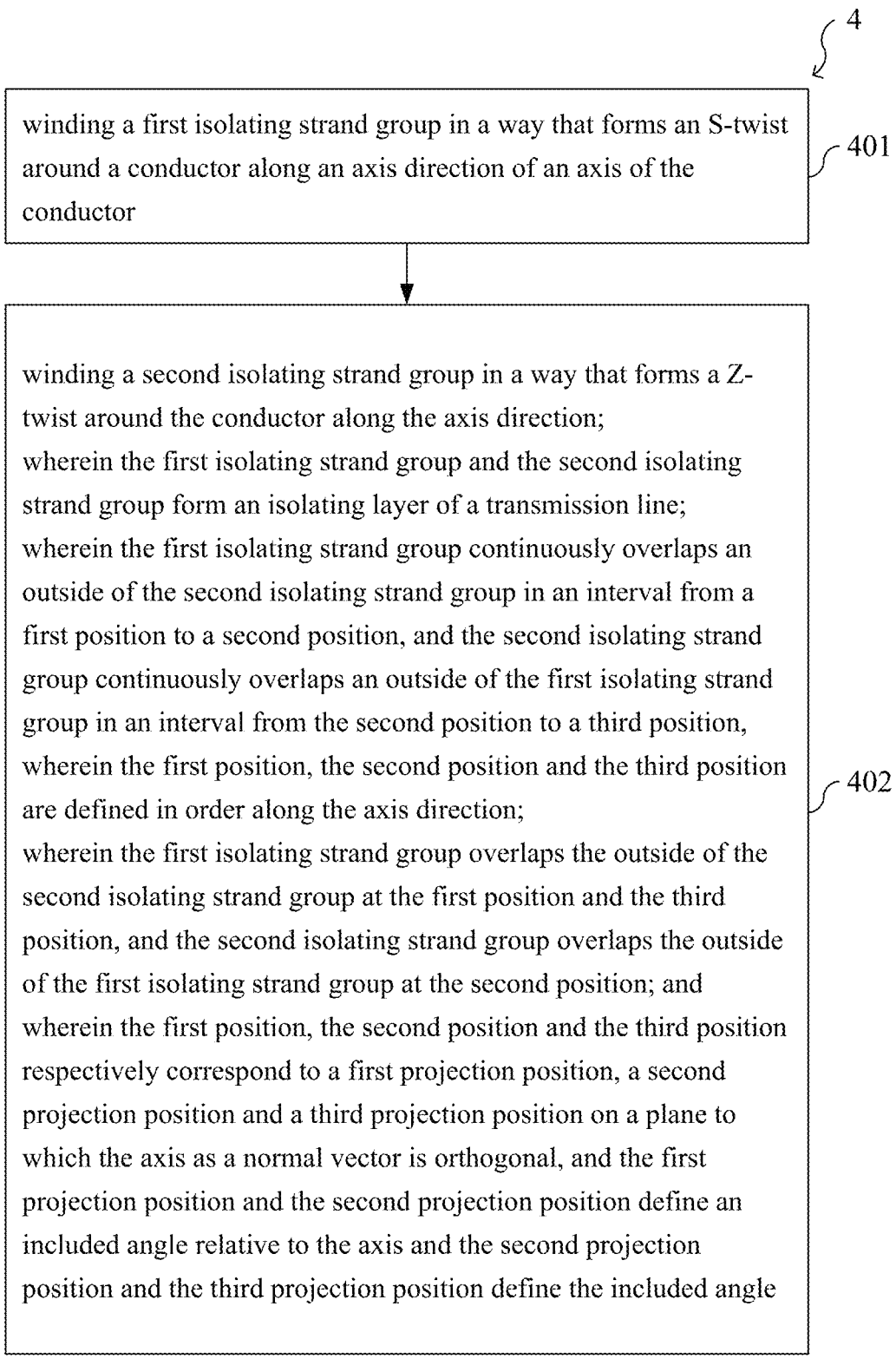
FIG. 4 illustrates a method for manufacturing an isolating layer of a transmission line according to some embodiments of the disclosed invention.

FIG. 4 illustrates a method for manufacturing an isolating layer of a transmission line according to some embodiments of the disclosed invention. The contents of FIG. 4 are shown as an example illustrating related embodiments and does not intend to limit the scope of the claimed invention.

Referring to FIG. 4, a method 4 for manufacturing an isolating layer of a transmission line may comprise the steps of: winding a first isolating strand group in a way that forms an S-twist around a conductor along an axis direction of an axis of the conductor (marked as step 401); and winding a second isolating strand group in a way that forms a Z-twist around the conductor along the axis direction (marked as step 402). In the method 4, the first isolating strand group and the second isolating strand group form the isolating layer of the transmission line. In the method 4, the first isolating strand group continuously overlaps an outside of the second isolating strand group in an interval from a first position to a second position, and the second isolating strand group continuously overlaps an outside of the first isolating strand group in an interval from the second position to a third position, wherein the first position, the second position and the third position are defined in order along the axis direction. In the method 4, the first isolating strand group overlaps the outside of the second isolating strand group at the first position and the third position, and the second isolating strand group overlaps the outside of the first isolating strand group at the second position. In the method 4, the first position, the second position and the third position respectively correspond to a first projection position, a second projection position and a third projection position on a plane to which the axis as a normal vector is orthogonal, and the first projection position and the second projection position define an included angle relative to the axis and the second projection position and the third projection position define the included angle.

In some embodiments of the method 4, the included angle can be an angle of 180 degrees.

In some embodiments of the method 4, the first isolating strand group may comprise a plurality of first isolated strands each of which is made of a first isolating polymeric material, and the second isolating strand group may comprise a plurality of second isolated strands each of which is made of a second isolating polymeric material. The first isolating polymeric material and the second isolating polymeric material can be the same or different. Each of the first isolating polymeric material and the second isolating polymeric material can be chosen from one of FEP, PFA, PE and PTFE or any combination thereof.

In some embodiments of the method 4, a dielectric constant of the isolating layer can be between 1.6 and 2.3. Preferably, the dielectric constant of the isolating layer 13 can be 1.67, 2.0, 2.03, 2.05, 2.1, or 2.26 with a standard/tolerable deviation.

In some embodiments of the method 4, the transmission line can be a coaxial cable.

The disclosed embodiments do not intend to limit the scope of the claimed invention. Any modifications, replacements, adjustments and/or combinations from/for the disclosed embodiments which a person having ordinary skill in the art can appreciate based on this disclosure are all covered in the disclosed invention, even though they are not fully disclosed in the above descriptions. The claimed invention is defined in the following claims as appended.

What is claimed is:

1. A transmission line, comprising:
   a conductor for signal transmission; and
   an isolating layer covering the conductor;
   wherein the isolating layer comprises a first isolating strand group and a second isolating strand group, the first isolating strand group is wound in a way that forms an S-twist around the conductor along an axis direction of an axis of the conductor, and the second isolating strand group is wound in a way that forms a Z-twist around the conductor along the axis direction;
   wherein the first isolating strand group continuously overlaps an outside of the second isolating strand group in an interval from a first position to a second position, and the second isolating strand group continuously overlaps an outside of the first isolating strand group in an interval from the second position to a third position, wherein the first position, the second position and the third position are defined in order along the axis direction;
   wherein the first isolating strand group overlaps the outside of the second isolating strand group at the first position and the third position, and the second isolating strand group overlaps the outside of the first isolating strand group at the second position; and
   wherein the first position, the second position and the third position respectively correspond to a first projection position, a second projection position and a third projection position on a plane to which the axis as a normal vector is orthogonal, and the first projection position and the second projection position define an included angle relative to the axis and the second projection position and the third projection position define the included angle.

2. The transmission line of claim 1, wherein the included angle is an angle of 180 degrees.

3. The transmission line of claim 1, wherein the first isolating strand group comprises a plurality of first isolated strands each of which is made of a first isolating polymeric material and the second isolating strand group comprises a plurality of second isolated strands each of which is made of a second isolating polymeric material, and the first isolating polymeric material and the second isolating polymeric material are the same or different.

4. The transmission line of claim 3, wherein each of the first isolating polymeric material and the second isolating polymeric material is chosen from one of PEP, PFA, PE and PTFE or any combination thereof.

5. The transmission line of claim 1, wherein a dielectric constant of the isolating layer is between 1.6 and 2.3.

6. The transmission line of claim 5, wherein the dielectric constant of the isolating layer is 1.67, 2.0, 2.03, 2.05, 2.1, or 2.26.

7. The transmission line of claim 1, wherein the transmission line is a coaxial cable, and the transmission line further comprises:
   a shielding layer, being arranged to cover the isolating layer; and
   a protecting layer, being arranged to cover the shielding layer.

8. A method for manufacturing an isolating layer of a transmission line, comprising:
   winding a first isolating strand group in a way that forms an S-twist around a conductor along an axis direction of an axis of the conductor; and
   winding a second isolating strand group in a way that forms a Z-twist around the conductor along the axis direction;
   wherein the first isolating strand group and the second isolating strand group form the isolating layer of the transmission line;
   wherein the first isolating strand group continuously overlaps an outside of the second isolating strand group in an interval from a first position to a second position, and the second isolating strand group continuously overlaps an outside of the first isolating strand group in an interval from the second position to a third position, wherein the first position, the second position and the third position are defined in order along the axis direction;
   wherein the first isolating strand group overlaps the outside of the second isolating strand group at the first position and the third position, and the second isolating strand group overlaps the outside of the first isolating strand group at the second position; and wherein the first position, the second position and the third position respectively correspond to a first projection position, a second projection position and a third projection position on a plane to which the axis as a normal vector is orthogonal, and the first projection position and the second projection position define an included angle relative to the axis and the second projection position and the third projection position define the included angle.

9. The method of claim 8, wherein the included angle is an angle of 180 degrees.

10. The method of claim 8, wherein the first isolating strand group comprises a plurality of first isolated strands each of which is made of a first isolating polymeric material and the second isolating strand group comprises a plurality of second isolated strands each of which is made of a second isolating polymeric material, and the first isolating polymeric material and the second isolating polymeric material are the same or different.

11. The method of claim 10, wherein each of the first isolating polymeric material and the second isolating polymeric material is chosen from one of PEP, PFA, PE and PTFE or any combination thereof.

12. The method of claim 8, wherein a dielectric constant of the isolating layer is between 1.6 and 2.3.

13. The method of claim 12, wherein the dielectric constant of the isolating layer is 1.67, 2.0, 2.03, 2.05, 2.1, or 2.26.

14. The method of claim 8, wherein the transmission line is a coaxial cable.

* * * * *